Sept. 27, 1938.  J. O. ALMEN ET AL  2,131,157
CONTROL FOR VARIABLE SPEED POWER TRANSMISSIONS
Filed March 9, 1931   4 Sheets-Sheet 1
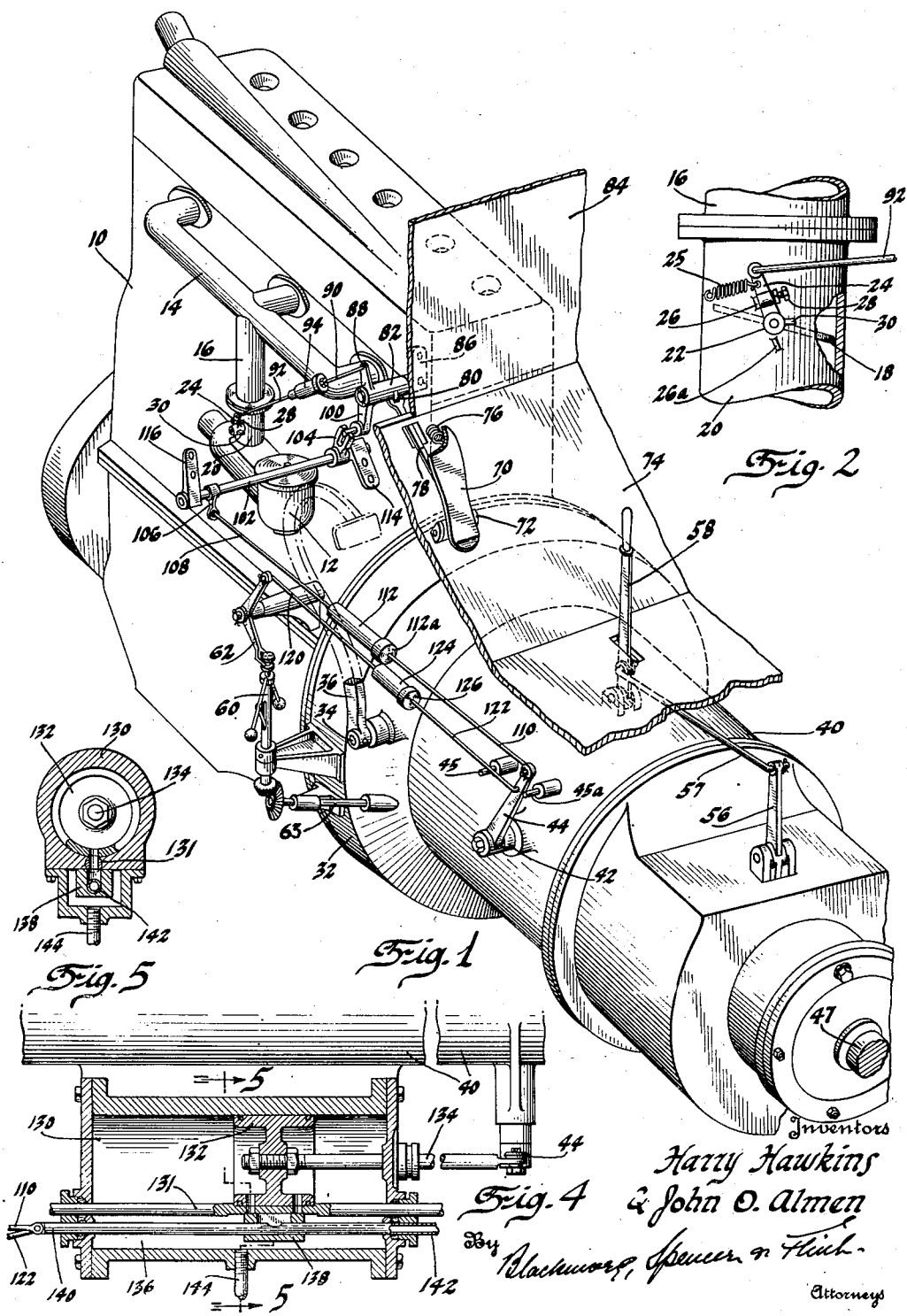
Inventors
Harry Hawkins
& John O. Almen
By Blackmore, Spencer & Finch
Attorneys Inventors
Harry Hawkins
& John O. Almen
By Blackmore, Spencer & Hub
Attorneys

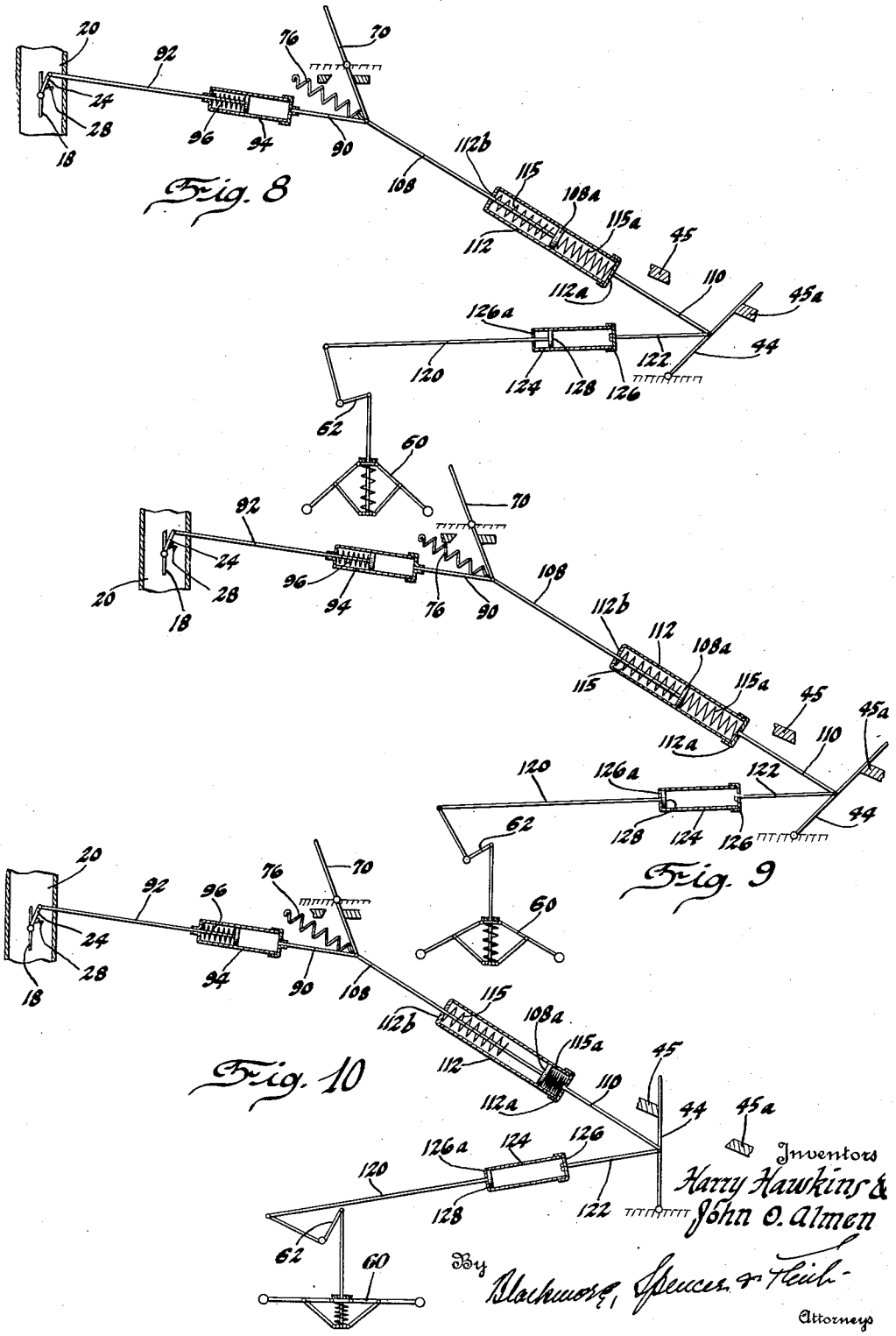

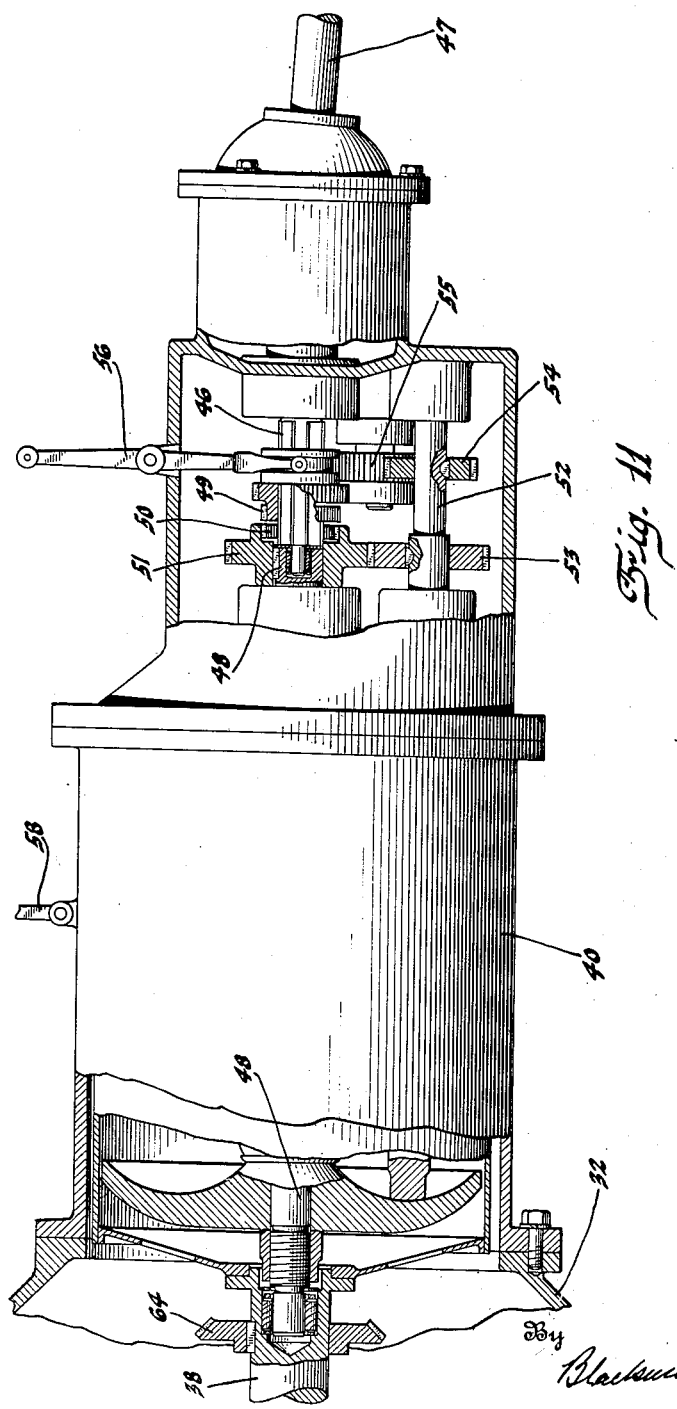

Patented Sept. 27, 1938

2,131,157

UNITED STATES PATENT OFFICE 2,131,157

CONTROL FOR VARIABLE SPEED POWER TRANSMISSIONS

John O. Almen, Royal Oak, and Harry Hawkins, Highland Park, Mich., assignors, by mesne assignments, to General Motors Corporation, Detroit, Mich., a corporation of Delaware Application March 9, 1931, Serial No. 521,324

33 Claims. (Cl. 74—472)

The invention herein disclosed relates to means for controlling operation of a motor vehicle equipped with an internal combustion engine and a variable speed-ratio transmission.

Principal objects of the invention are to obtain maximum vehicle performance whenever desired and improved economy under ordinary driving conditions.

These objects may be satisfactorily realized in a motor vehicle driven by an internal combustion engine coupled to a transmission train susceptible of transmitting the power of the engine to the traction road wheels at any speed ratio whatever within the limits of speed ratio variation established by the design of the transmission,—the transmission being, in other words, susceptible of adjustment in an infinite number of steps as distinguished from the usual sliding gear transmission which is limited to three or four definite speed ratio changes effected step by step. It is assumed, of course, that the desirable upper and lower limits of the transmission speed ratio shall be determined as a result of a consideration of the characteristics of the engine and power requirements of the vehicle.

In the description following the term low speed ratio is used to indicate a lower rate of speed of the power output shaft with respect to that of the power input shaft, and the term high speed ratio is used to indicate a higher rate of speed of the power output shaft with respect to that of the input shaft.

In accordance with this invention, it is intended, for normal or ordinary driving conditions (that is, for conditions of uniform speed on an approximately level road) that for a wide range of car speeds up to and including a predetermined moderate speed, the engine be operated at a substantially constant speed with variable power output (as controlled for instance by throttle opening) while the transmission speed ratio is varied in order to maintain engine speed substantially constant by maintaining a balance between engine power and power requirements of the vehicle; and that also for normal driving conditions above the said predetermined moderate car speed, the engine be operated at speeds in relation to car speeds at which the engine power output does not greatly exceed the power requirements of the vehicle, the transmission speed ratio being varied to permit changes in engine speed. It is further intended that provision be made whereby the engine may at will be rapidly accelerated to speeds approaching that speed at which the engine develops its maximum power, thus making available to the car the maximum power of which the engine is capable in order to obtain maximum possible acceleration and hill climbing performance.

Incidental to the achievement of the principal objects of the invention several advantages accrue from the mode of operation proposed, to wit:

The accelerating and hill climbing capacity of the car is greatly increased; improvements in economy result; carburetion is simplified; lower engine speeds are obtained under ordinary driving conditions, and maximum engine speed is appreciably reduced,—i. e. never exceeds its speed of maximum power output, favoring long engine life and quietness of operation.

Due to lower maximum engine speed the problem of lubrication becomes simplified; possibility of valve spring vibration or surging is lessened and possibility of breakage of valve springs thereby reduced; the problems of crank shaft vibration are simplified since, with lower maximum engine speed it becomes possible to design a crank shaft having a natural frequency of torsional vibration well above the frequency of the periodic thrusts of the piston rods.

A not insignificant advantage, inherent in the mechanism hereinafter disclosed for practicing the invention, is that in ordinary driving the transmission speed ratio is adjusted to the power output of the engine without any need on the part of the operator to exercise his judgement respecting what output speed is best adapted to the input or engine speed, and without any action on his part other than to operate a single control lever which takes the place of both accelerator pedal and gear shift lever of conventional motor cars of the present time.

Other advantges of the proposed mode of operation and the instrumentalities disclosed for carrying it into effect will be apprehended from a consideration of the detailed description following and of the drawings accompanying it in which:

Fig. 1 is a perspective view of one control mechanism adapted to operate in accordance with this invention illustrated as applied to an automobile engine and transmission;

Fig. 2 is a detail view of a fragment of the engine induction conduit and of the throttle valve;

Fig. 4 is a longitudinal section of a booster motor that may be interlinked in the control mechanism if desired;

Fig. 5 is a cross section of said motor on line 5—5 of Fig. 4;

Figure 3:
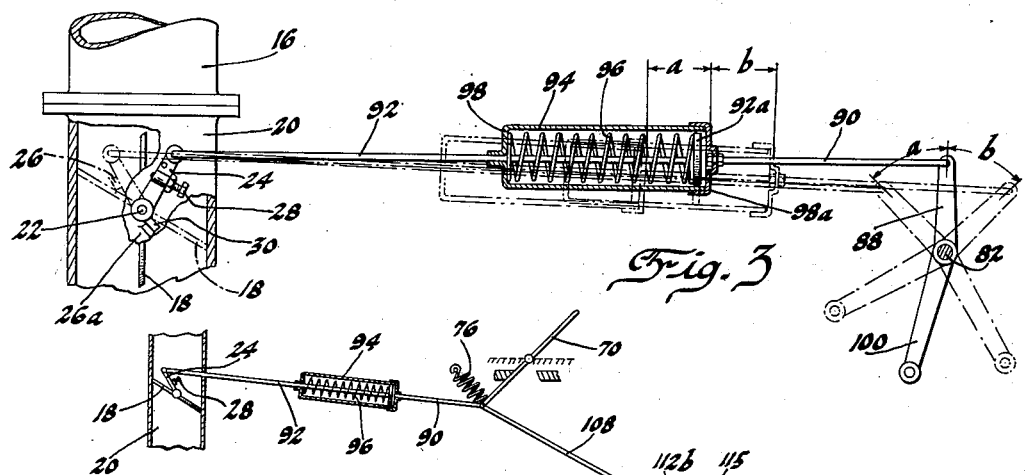
Fig. 3 is a detail view of an elastic coupling in the connection between the throttle valve and car control lever.

Figs. 6 to 10 inclusive are diagrammatic views illustrating certain relative positions assumed by car control lever, ratio control lever and governor during "pick up" of the car from standing position to highest speed, and Fig. 11 is a side elevation of the transmission housing having parts broken away disclosing interior mechanism.

The driver's or operator's control of engine speed and power and of speed ratio adjustment of the transmission is intended to be exercised by means of a car control lever,—preferably a pedal similar to the ordinary pedal in common use in motor cars. This lever, during a first moiety of its range of movement from fully released position, controls, for example, engine throttle opening and does not act directly to influence the speed ratio adjustment of the transmission. After the throttle has been opened to the predetermined extent, further movement of the car control lever in the remainder of its range does not affect the throttle, but operates directly to influence the speed ratio of the transmission. Changes in engine speed in turn affect the speed of a governor that then acts to change transmission speed ratio in such manner that the transmission is adjusted automatically to that ratio which is suitable to the power output of the engine and the power requirements of the vehicle. Hence, the transmission speed ratio is adjusted by means of the car control lever,—either directly, or indirectly by causing the governor to act. For extremes of engine speed (below a pre-determined minimum and above a pre-determined maximum),—that is, what on the one hand corresponds to low engine and car speeds, approaching idling, or on the other hand to high engine speeds associated with maximum acceleration or maximum car speed—the governor assumes complete control of transmission speed ratio. For engine speeds intermediate the said extremes the governor is inoperative with reference to its effect on the transmission, and speed ratio is controlled by the operator directly by means of the car control lever.

In Fig. 1, numeral 10 indicates a conventional internal combustion engine, which may be of a type utilizing carbureted air mixtures as fuel. The carburetor is indicated at 12, the manifold of the fuel induction apparatus at 14, a manifold riser section at 16, and (see Fig. 2) a throttle valve at 18. The throttle valve is shown disposed in the fuel mixture outlet branch 20 of the carburetor. The branch 20 registers with the riser section 16 and constitutes the lower portion of the manifold riser. The throttle valve, here shown as of butterfly type, disposed in branch 20, is provided as usual with trunnions one of which projects thru the wall of said branch, as indicated at 22, and carries secured to it an arm 24, by means of which the valve may be opened against the elastic force of a spring 25 upon depressing the control pedal 70. Any suitable stops, such as 26a and 26, may be provided to limit the amplitude of movement of arm 24 and thereby fix the open and closed (idling) position of the throttle. When the adjustable stop screw 28 in arm 24 is in contact with stop 26 as shown, the throttle is closed; when the right angled extension 30 of said arm 24, is in contact with stop 26a, the throttle is open.

Numeral 32 (Fig. 1) indicates a bell housing of conventional form which incloses the usual engine fly wheel, power input shaft and main clutch. A clutch operating rock shaft is indicated at 34 to which a clutch operating pedal lever 36 is secured. Fly wheel and main clutch, are not illustrated as they may be of conventional form. The main clutch shaft serving as the power input shaft is indicated at 38, Fig. 11.

Numeral 40 (Fig. 1) indicates the transmission housing. The transmission may be of any suitable type susceptible of infinite variation of speed ratio within the limits imposed by the design. The control mechanism illustrated has been designed particularly to control the speed ratio adjustment of an infinitely variable friction transmission such as is disclosed in application Serial No. 414,899, filed by Jacob Ehrlich December 18, 1929 and patented Nov. 27, 1934, Patent No. 1,981,910; it is equally applicable to a transmission of the type shown in U. S. Patent to Spencer No. 751,958. As illustrated in Fig. 1 a rock shaft 42 journaled in the housing 40 is utilized to transmit movement of the car control lever and governor to the control elements within the housing. If this control mechanism were applied to the construction illustrated in the Spencer patent the rock shaft 42 would correspond to the rock sleeve indicated in said Spencer patent by numeral 20. A means for operating rock shaft 42 may be a crank or lever arm 44 secured to said rock shaft. Arm 44 is herein designated the ratio control arm and may be connected by suitable means, such as links and levers, to both car control lever 70 and governor 60; or it may be connected to a booster motor, as hereinafter described, controlled by the car control lever and governor. Stops 45 and 45a limit the amplitude of movement of said arm 44.

A shaft to be driven by the shaft 48, which supports the variable speed ratio members of the transmission, is indicated at 46, (Fig. 11). Shaft 46, it will be understood, transmits power from the variable speed ratio members to the vehicle traction wheels. In the illustrated embodiment shaft 46 is provided with longitudinal splines and is coupled by a universal joint at one end to shaft 47, which may be considered as the propeller shaft of a rear-wheel driven automobile; the other end is rotatively piloted in the rear end of shaft 48. Slidable on the splined shaft 46 is a composite sliding clutch member and gear 49 having external clutch teeth adapted to intermesh with internal clutch teeth 50 formed on a gear 51 keyed to shaft 48. Two gears 53 and 54 are rigidly secured to a countershaft 52, gear 53 being in constant mesh with gear 51. Gear 54 is in constant mesh with an idler gear 55, in position to intermesh with the gear teeth of slidable member 49 when the latter is moved sufficiently rearward. Member 49 may be caused to slide on shaft 46 by a shift-lever 56 having a yoke engaging a groove in the member, said lever 56 having a link connection 57 with a manual control lever 58. By moving the sliding member 49 forward to interlock its clutch teeth with the clutch teeth 50, the transmission shafts 48 and 46 are directly connected and the rotations of shaft 48 are transmitted to shaft 46 in the same direction to drive the car forward. By moving said sliding member 49 rearward to intermesh its gear teeth with the teeth of the idler 55, rotation of shaft 48 is transmitted to shaft 46 to cause the latter to rotate in the reverse direction and so drive the car rearward. If sliding member 49 is moved to the intermediate position illustrated, shaft 46 is functionally disconnected from shaft 48, and no power can be transmitted from the engine to the vehicle traction wheels or the reverse. The selective tooth gear assembly described, and here shown cooperating with the power output end of the variable speed ratio transmission, constitutes a means controllable by the vehicle operator whereby the vehicle may be driven in reverse as well as forward directions and whereby the drive train between engine and traction wheels may be functionally disconnected, or, as commonly expressed, placed in "neutral", independently of the main clutch adjacent the engine.

A governor illustrated as geared to the drive or main clutch shaft between the main clutch and variable ratio transmission as indicated in Fig. 1, operates to adjust and regulate the position of the ratio control arm in response to certain predetermined high and low speeds of the engine. Between the engine speeds at which it is desired that the governor shall adjust the transmission ratio the ratio control arm responds to movement of the car control lever. The governor may be of conventional centrifugal type, as shown at 60, and act upon the ratio control arm 44 thru a lever 62 and a lost motion connecting member to be more specifically described. In Fig. 11, a gear 64 is shown secured to power input shaft 38 to which the governor driving shaft 63 may be geared.

Thus far there have been pointed out in addition to the car control lever 70 three main control elements consisting of the throttle, the ratio control arm and the governor. The means by which a driver is able to impress his will upon the throttle and ratio control arm by muscular effort and the means by which the governor affects the position and movements of the control arms will be described and explained in the paragraphs following.

In the illustrated embodiment the control efforts of the car operator are intended to be applied by foot to said car control pedal lever 70 pivoted as at 72 to the inclined floor board 74. Lever 70 is subject constantly to the pressure of a strong spring 76 which tends to oppose pressure of the operator's foot and to restore said lever to fully released position,—the position desired when the car is at rest. A link 78 passing thru a hole in the floor board connects the car control lever with an arm 80 rigid with a rock sleeve 82 sleeved on a stud which may be secured to any suitable support, such as the dash board (of which a fragment is shown at 84), as by a bracket 86. A two-armed rock lever is rigid with said sleeve 82. One arm 88 of said two-armed rock lever is connected to arm 24 of the throttle valve by an elastic link. In the illustrated embodiment (Fig. 3) this link is composed of two rod sections 90 and 92 connected end to end by an elastic coupling 94. The coupling comprises a preferably pre-compressed coil compression spring 96 housed within a casing surrounding rod section 92 and exerting its elastic force between one closed end 98 of the casing and an enlargement 92a on the end of rod section 92. Rod section 90 is connected to a cap 98a closing the other end of the coupling casing. Spring 96, therefore, tends to shorten the elastic link but to permit it to be extended after the throttle has been opened to the limit permitted by the stops, thus allowing further rocking movement of the two-arm rock lever referred to in order to enable control to be exercised upon the transmission after and while the throttle remains at maximum predetermined opening as will presently appear. The elastic resistance of throttle closing spring 25 and the link coupling spring 96 are so proportioned that the throttle may be opened to the maximum without materially further compressing or shortening the coil of spring 96.

The other arm 100 of said two-armed rock lever transmits the force due to movement of car control lever 70 to the ratio control arm 44 by means of an intermediate two-armed rock lever comprising a rock shaft 102 rigid with which are arms 104 and 106, and a linkage composed of rod sections 108 and 110 disposed in line and coupled by a two-way elastic coupling 112. The rock shaft 102 may be journaled to any suitable part of the frame or body. It is illustrated as journaled in bracket 114 bolted to the inclined floor board 74 and bracket 116 bolted to the dash 84. Arm 104 may be moved by arm 100 through the medium of a pin and slot connection between them adapted to compensate for their different arcs of movement. The end of arm 106 may be pivoted to rod section 108 and ratio control arm 44 pivoted to rod section 110, whereby force exerted by movement of arm 106 may be transmitted to ratio control arm 44 by an elastic linkage, which will permit the governor to move or limit the movement of said control arm without affecting the position of car control lever 70. This linkage is elastic in both senses since coupling 112 houses two coil compression springs 115 and 115a between which is disposed a head 108a formed on rod section 108 while rod section 110 is secured to cap or head 112a of the coupling housing (see diagrams Figs. 6 to 10). Spring 115 exerts its elastic force between the closed end 112b of the coupling housing and head 108a, while spring 115a exerts its elastic force between the opposite or cap end 112a of the coupling housing and said head 108a. Springs 115 and 115a have less elastic force than pedal spring 76.

In the disposition and arrangement of parts disclosed it is contemplated that a movement of ratio control arm 44 toward the engine (to the left in Fig. 1) adjusts the transmission to a higher speed ratio, i. e., a relation such that the output shaft is rotated with increased speed compared to that of the input shaft and a corresponding decrease of mechanical advantage to the engine; and that a movement of ratio control arm away from the engine (to the right in Fig. 1) adjusts the transmission to a lower speed ratio, resulting in a relative decrease of output shaft speed with respect to that of the input shaft and a corresponding increase of mechanical advantage to the engine.

When the engine is operating at a moderate speed, and also when it is operating at a high speed, the governor 60 is adapted to apply force tending to move ratio control arm through said governor operated lever 62 and a lost motion linkage connected between the work arm of the governor lever and said ratio control arm. The linkage last mentioned is susceptible of a limited telescoping movement since the two rod sections 120 and 122 thereof are connected by a lost motion coupling 124 comprising a casing, to the cap end 126 of which the forward end of rod section 122 is secured, while the rear end of rod section 120 slides freely within an orifice at the end 126a of the casing (see diagrams Figs. 6 to 10). The extremity of rod section 120 within the casing is provided with a head 128 which limits the lengthening and shortening movements of the rod sections. Thus governor 60 cannot move the control arm 44 toward low ratio position until the head 128 contacts with the cap end 126 nor can it move said control arm toward high ratio position until said head 128 contacts with the other end 126a of the casing. The governor is so designed and loaded that the force exerted by it, when idle, upon ratio control arm 44 is greater than the elastic force of spring 115 in the linkage between car control lever 70 and ratio control arm 44.

In the event that a transmission which requires a relatively large effort to bring about ratio changes is installed in a motor vehicle, the changes may be effected by a servo or booster motor controlled by the operator's muscular exertions and/or the governor 60. Any suitable motor may be installed for this purpose. Preferably a motor should be selected that can be energized by sources of energy customarily present in motor vehicles. Figs. 4 and 5 illustrate on a scale considerably enlarged as compared with that of Fig. 1, a booster motor adapted to utilize the pressure produced by a pump which may be the oil pump of the engine lubricating system. Neither the particular form of motor nor the means for energizing it constitutes any part of this invention. The motor illustrated is an hydraulic follow-up motor of previously known construction.

The motor illustrated has a cylinder 130 and piston 132. The piston rod 134 is suitably connected to control arm 44. A ported slide 131 is secured to the piston. This slide is guided in a slot in the cylinder wall between the cylinder bore and valve chest and closes communication between the valve chest and cylinder bore except through the ports. Numeral 136 indicates the valve chest, 138 a slide valve, 140 the slide valve operating rod, 142 the exhaust pipe which is slidable with the valve, and 144 the inlet for fluid under pressure to the valve chest. It will be understood that the inlet 144 is intended to be connected with, for example, the pressure side of a pump (not shown, but which may be the lubricating pump) and that the exhaust pipe is intended to discharge the oil from the exhaust side of the piston,—preferably into the sump of the pump. The extremity of rod section 110 which is connected to the car control lever 70 by intermediate links and levers, is shown as pivoted to the valve operating rod 140; so also is the rod section 122 which is controlled by the governor. It will be observed that movements of the rod section 110 or 122 to the rear (the right as shown by the drawings) will cause the booster motor to move arm 44 toward the rear and movement of either of said rod sections forward (to the left as shown by the drawings) will cause the booster motor to move said arm 44 forward exactly as in the case of the unassisted operator or centrifugal governor control described.

As indicated in Fig. 3 and in the diagrams Figs. 6 to 10, during a portion (one half more or less) of its total movement forward from fully released position the car control pedal 70 moves the throttle toward and to full or predetermined limit of opening. At completion of this portion of the movement of the pedal, (and rock arm 88) which may be designated arc (a) (Fig. 3), the throttle has been moved to its fully open or predetermined open position. In this movement spring 96 has not been substantially further compressed or shortened. During the remainder of the range of movement of said pedal (and rock arm 88), which may be indicated by arc (b) (Fig. 3), the throttle is not moved but remains open to the extent permitted by the stops while the pedal (and rock arm 88) may be operated in the arc (b) (by reason of the yielding of spring 96) to shift the ratio control arm 44 through the agency of the elastic linkage within that speed range in which the governor does not exert any control.

Figure 7:
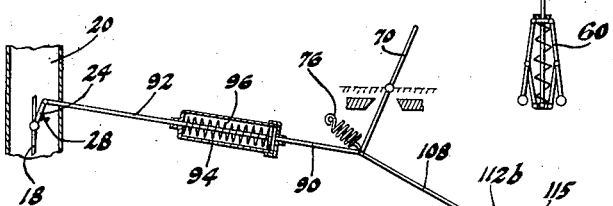

The proportions of the linkage elements and elastic couplings with respect to car control lever, throttle, and ratio control arm are such that when the throttle has been moved to an open position without any substantial compression of throttle link spring 96, and when ratio control arm is in extreme high speed ratio position the linkage between said ratio control arm and car control lever is then of a length midway between its collapsed and extended dimensions. In this position, as illustrated in Fig. 7, the head 108a of link rod section 108 is held centrally of casing 112 by the pressure of springs 115 and 115a on opposite sides. In all other relative positions of car control lever and ratio control arm said springs 115 and 115a do not press in the same proportions upon said head 108a.

Figure 6:
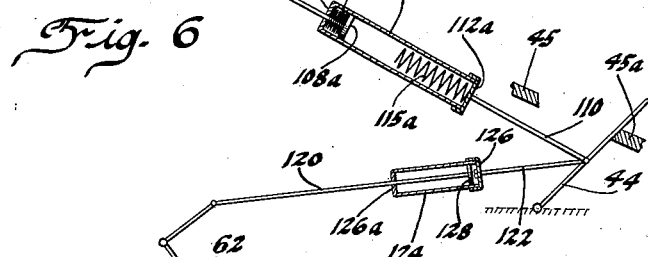

When the power input or drive shaft 38 is stationary, idling, or rotating below a predetermined low speed, the governor 60 will hold the ratio control arm in low speed ratio position (Fig. 6). As the engine speed (drive shaft speed) increases above this predetermined minimum the governor relieves the pressure exerted by it tending to hold the ratio control arm 44 in position to give low car speed and allows control to be exercised by compressed spring 115, while pedal 70 is in position within the second moiety of its range of movement wherein it does not effect any change of the throttle from full open position, to shift ratio control arm toward the position to give high car speed.

Fig. 1 and diagrammatic Fig. 6, illustrate the relative positions of the control elements prior to starting the car. Car control pedal lever 70 is in the fully released position, shifted rearward to its limit of movement, and so held by spring 76. At this time the transmission is also functionally disconnected from the traction wheels at the rear of the variable speed members owing to the neutral position of gear 49 as shown in Fig. 11. The linkage between pedal 70 and throttle is fully collapsed and in throttle closing position; the throttle is held closed by said linkage and throttle spring 25. Ratio control arm 44 is held to extreme low car speed position by governor 60, the effort of which, as before stated, is stronger than that of spring 115 in the elastic linkage between car control lever and said ratio control lever.

Spring 115 is therefore held compressed ready to move said ratio control arm into higher speed ratio position when the engine attains a speed (after the main clutch and gears 49 and 51 have been coupled) sufficient to cause the governor 60 to retract the head 128 of link rod 120 away from the end 126 of lost motion connection casing 124.

Diagram Fig. 7 illustrates the relative positions of the control elements when car control lever 70 has been depressed or advanced far enough to open the throttle to the extent permitted by the stops without further compressing the spring 96 in the elastic linkage between said lever and throttle. The engine has speeded up to a degree such that the governor has withdrawn the end of link rod 120 far enough to allow spring 115 to expand and pull ratio control lever 44 into higher ratio position. The throttle is now prevented by stop 26a from any further movement due to further depression of the pedal, and head 108a of link 108 is in mid position within casing 112 so that further forward movement of the pedal will compress and shorten spring 96 and allow elongation of the throttle controlling linkage without changing the throttle from its open position, and will compress spring 115a which exerts its elastic force to move the ratio control lever 44 toward low speed ratio position. The transmission ratio is now under operator control only as the end 128 of governor controlling link does not bear against either end of the lost motion casing 124. So if the pedal 70 be now depressed or pushed forward it will move ratio control arm 44 to extreme low output speed position as shown in Fig. 8.

Diagram Fig. 8 shows the throttle still wide open, pedal 70 pushed forward as far as possible, compressing spring 96 in the throttle link and spring 115a in the ratio control arm link, thus keeping the transmission in a low output-speed position. The engine is increasing in speed but has not yet reached a speed at which the governor has any effect on the ratio control arm, as the end 128 of governor link rod 120 is not now in contact with either end of the lost motion casing 124. The ratio control arm is now under operator control with throttle fully open.

Diagram Fig. 9 shows pedal 70 still in its extreme forward position, throttle fully open, throttle-link spring compressed, ratio control arm in extreme low speed ratio position and engine speed up to a degree which causes the governor to pull the end 128 of governor link 120 into contact with the forward end of lost motion casing 124. With the pedal kept in its forward position the governor is about to take control of the transmission ratio.

In diagram Fig. 10 pedal 70 and throttle are still respectively in extreme forward and open position, the engine has speeded up to such a degree that the governor has caused governor link rod 120 to pull the casing 124 forward and move the ratio control arm into high speed ratio position.

The diagrams Figs. 6 to 10, inclusive, show the parts of the control in simplified form and arrangement as compared with Fig. 1, in order to facilitate understanding of the mode of operation.

The described elastic and telescopic link connections between car control lever, throttle, and ratio control arm, and between governor and ratio control arm, embody compensating devices providing for differential movements of the several control elements whereby automatic and operator control of transmission ratio may be exercised independently under those car operating conditions wherein this independence of control is desired, and whereby the throttle may be kept in its full open position while accelerating car speed or operating the car at engine peak power. It will be perceived from the diagrams and description that springs 115 and 115a, in the linkage from car control lever 70 to ratio control arm 44, need have enough elastic force when compressed merely to overcome the resistance to movement of the ratio control arm and internal parts connected to it, and that the effort imposed by them on governor action is negligible.

The operation of the control mechanism in the acceleration of a car from a stationary position to highest speed may be described as taking place through five successive phases:

(1) With the clutch pedal 36 depressed and clutch disengaged the operator starts the engine in the usual manner, depresses or moves forward the car control pedal 70 part way within the arc (a) of its range and allows the engine to "warm up" before engaging the clutch. Depression of the pedal opens the throttle more or less, but does not affect the ratio control arm which is now held in low-speed ratio position by the governor (Fig. 6), which, as before stated, is proportioned and arranged to exert a stronger force than spring 115 in the linkage between pedal and ratio control arm. When the engine is deemed to have run long enough to get properly warmed, the main clutch may be engaged. At this time the transmission is in low, as explained, just as in the case of starting a car equipped with conventional gear transmission.

If the selective tooth gears described are in "neutral" relation the main clutch engaged during the warming up period, the governor will, during this period, operate to shift the transmission ratio in accordance with engine speed. Upon reduction in governor speed, however, incident to disengaging the main clutch and shifting the selective gears into a positive drive relation, the governor will have shifted the transmission into low speed ratio.

(2) While the engine speed, after engagement of the clutches, is less than the minimum speed at which the governor begins to withdraw the end of governor link rod 120 in a forward direction, the transmission is maintained thereby in its lowest speed ratio. Increase in car speed during this period is effected by opening the throttle farther within the first moiety of the range of movement of the car control pedal. As the throttle is gradually opened the engine speed will eventually reach the minimum speed at which the governor permits increase of ratio, that is, a speed high enough to move the end of rod 120 forward from the position shown in Fig. 6.

(3) When the throttle reaches a degree of opening that brings the engine speed up to the minimum at which the governor just begins to release its pressure upon the ratio control arm, the transmission is still in its lowest ratio. Further opening of the throttle tends to speed up the engine and consequently the governor. The governor, however, as indicated in Fig. 7, will now shift link rod 120 forward and permit spring 115 in the pedal-to-ratio-control-arm linkage to move the ratio control arm toward high speed ratio position so that the engine will be held at the minimum speed permitted by the governor. As the throttle is further opened to fullest extent the engine will be operating within its minimum governed speed range with the transmission in high car speed adjustment.

(4) In the phase now reached the engine is operating at full throttle and transmission output speed may now be brought under operator control (Figs. 7 and 8) for a further increase of output or car speed. The transmission may be adjusted to low speed output if desired by moving pedal lever 70 forward as indicated in Fig. 8; as a result the engine will attain a higher speed, develop and transmit more power to the car.

(5) With the decrease in speed of the output shaft with respect to that of the input shaft as just described and the throttle at a predetermined opening the engine will eventually attain its speed of maximum power output or other predetermined maximum speed. At this speed (Fig. 9) the governor takes control and overcoming the pressure of spring 115a changes the ratio in such manner as to keep the engine at this speed,—that is, the speed of maximum power output. Regardless of car speed the engine with the throttle opening shown is delivering its maximum horsepower and consequently affording maximum acceleration.

When it is desired to slow the engine and car speed or stop the car the operator allows car control pedal 70 to move toward released position under the influence of pedal spring 76. This movement of the pedal causes the throttle valve to move toward closed position while the governor still holds the ratio control arm in high-speed ratio position and the head 108a of link rod section 108 moves within the casing of coupling 112 partially relaxing spring 115a without affecting the position of ratio control arm. With the throttle partly closed and transmission in high speed ratio the engine will quickly lose speed. When the drive shaft or engine speed has dropped to that degree at which the head 128 of the governor linkage contacts with the cap end 126 of the lost motion coupling 124, the governor will begin to move ratio control arm 44 toward a low-speed ratio position, at which the engine can still drive the car. As the engine speed is reduced by further movement of the throttle valve toward closed or idling position the governor moves the ratio control arm further toward low-speed ratio position. The correlation of engine speed and transmission ratio will continue throughout the throttle valve movements. When the engine speed is insufficient to move the car at lowest-speed ratio of course the car will stop. Brake equipment (not illustrated) will be used in the ordinary manner as conditions may dictate. Declutching and shifting to neutral is done according to practice usual in connection with transmissions hitherto in use.

Although we have disclosed a specific mechanism as required by law by which the described method of controlling a motor vehicle may be practiced, we do not intend to be limited to the details of the disclosure as other instrumentalities may be utilized for practicing the method without departing from the spirit of the invention.

We claim:

1. In a motor vehicle the combination of an internal combustion engine with an infinitely variable speed ratio transmission; means for regulating the speed of the engine; means for automatically varying the ratio of the transmission at engine speeds above and below a predetermined high and intermediate engine speed and means controllable by the operator to vary the transmission ratio at engine speeds between said high and intermediate speeds while the means for regulating the engine speed is held adjusted to a predetermined limit.

2. In a motor vehicle the combination of an internal combustion engine with an infinitely variable speed ratio transmission; a throttle valve for regulating the supply of combustible mixture to the engine, transmission ratio control means, a car control device adapted to be operated by the driver, and operative connections between the car control device, said throttle and said transmission ratio control means constructed and arranged to open the throttle a predetermined extent before exercising control on the transmission ratio, and thereafter to adjust the transmission ratio while holding the throttle open to said predetermined extent.

3. A combination as defined in claim 2 in which the connections between the car control device, throttle and transmission ratio control means are elastic.

4. A combination as defined in claim 2 in which the connections between the car control device, throttle and transmission ratio control means are elastic, the construction and arrangement thereof permitting the throttle valve to be opened during a portion of the range of movement of the car control device without deforming the elastic connection to said throttle, and a further movement of said car control device, allowed by said elastic connection, permitting force to be applied thereby to the transmission ratio control means.

5. In a motor vehicle, the combination of an internal combustion engine with an infinitely variable speed ratio transmission; means for regulating the engine speed; means for varying the transmission ratio; a movable car control device adapted to be operated by the driver; elastic link connections between the car control device, the means for regulating the engine speed and the means for varying the transmission ratio; a speed responsive governor and a lost motion connection between the governor and the means for varying the transmission ratio.

6. A combination as defined in claim 5, in which the elastic link connection between the car control device and the means for varying the transmission ratio comprises two springs each exerting its elastic force in a sense opposite that in which the other exerts its elastic force.

7. In a motor vehicle the combination of an internal combustion engine with an infinitely variable speed ratio transmission mechanism; a throttle valve for regulating the supply of combustible mixture to the engine; movable transmission ratio control means; means for limiting the extent of movement of the throttle valve; a movable car control device; connections from the car control device to the throttle valve and to the transmission ratio control means; means constituting parts of said connections permitting the throttle valve to open until stopped by the limiting means therefor in response to movement of the car control device in one direction in one moiety of its range of movement, and for imparting force to the transmission ratio control means in response to a further movement of the car control device in the other moiety of its range of movement.

8. The combination defined in claim 7 with the addition of a speed responsive governor, a lost motion connection between the governor and the transmission ratio control means proportioned to effect adjustment of transmission ratio at a moderate engine speed, in a higher speed ratio position during a predetermined higher rate of engine speed and to release control directly to the car control device during the intermediate range of speed between said moderate and higher rates of engine speed.

9. In a motor vehicle the combination of an internal combustion engine with an infinitely variable speed ratio transmission mechanism; means for regulating the speed of the engine; means for varying the ratio of the transmission mechanism; a booster motor for operating said means for varying the ratio of the transmission mechanism; a controlling device for the booster motor; a car control device arranged to be actuated by the operator; an operative connection between said car control device and said means for regulating the speed of the engine, an operative connection between said car control device and said device for controlling the booster motor, and means constructed and arranged to prevent operation of the booster motor by the car control device until the means for regulating the speed of the engine has been adjusted to the predetermined limit and thereafter to permit operation of the booster motor while the means for regulating the engine speed is held adjusted to said predetermined limit.

10. In apparatus for control of the velocity of a motor vehicle provided with a transmission having speed ratio changing mechanism and driven by an engine having a throttle to control the engine speed, the combination of automatic mechanism to actuate the ratio changing mechanism, means to open the throttle for increasing the velocity of the vehicle, means operable by the operator after a desired velocity has been attained to vary the speed ratio of the transmission and thereby control the speed of the vehicle while maintaining a predetermined constant throttle opening, and operator-operable actuating means common to both said means.

11. In a motor vehicle, the combination of an engine provided with a throttle adapted to control engine speed; a variable speed ratio transmission mechanism adapted to transmit power from the engine; automatic means constructed and arranged to adjust the ratio of the transmission mechanism in proportion to engine speed; operator controllable means constructed and arranged to move the throttle and thereby vary at will the area of the throttle opening; operator controllable means constructed and arranged to adjust the ratio of the transmission independently of the action of the automatic means while maintaining a predetermined constant throttle opening.

12. In a motor vehicle, the combination of an engine provided with a throttle adapted to control engine speed; a variable speed ratio transmission mechanism adapted to transmit power from the engine; a ratio control device adapted to be actuated to vary the speed ratio of the transmission mechanism; automatic means constructed and arranged to actuate the ratio control device, and thereby adjust the ratio of the transmission mechanism in proportion to engine speed; operator controllable means constructed and arranged to move the throttle and thereby vary at will the area of the throttle opening; operator controllable means constructed and arranged to actuate the ratio control device independently of the actuation thereof by the automatic means, while maintaining a predetermined constant throttle opening.

13. In a motor vehicle, the combination of an engine provided with a throttle adapted to control engine speed; a variable speed ratio transmission mechanism adapted to transmit power from the engine; a ratio control device adapted to be actuated to vary the speed ratio of the transmission mechanism; automatic means constructed and arranged to actuate the ratio control device and thereby adjust the ratio of the transmission mechanism in proportion to engine speed; an operator controllable device having operative connections with the throttle and with the ratio control device, said connection between the operator controllable device and the ratio control device being constructed and arranged to actuate the ratio control device independently of the actuation thereof by the automatic means while maintaining a predetermined constant throttle opening.

14. In a motor vehicle, the combination of an engine provided with a throttle adapted to control engine speed; a variable speed ratio transmission mechanism adapted to transmit power from the engine; a ratio control device adapted to be actuated to vary the speed ratio of the transmission mechanism; a speed responsive governor, a lost motion device operatively connected to the governor and the ratio control device constructed and arranged to render the governor effective at a moderate and at a maximum engine speed; operator controllable means constructed and arranged to open and close the throttle; operator controllable means constructed and arranged to actuate the ratio control device independently of the governor at engine speeds between said moderate and maximum speeds while maintaining a predetermined constant throttle opening.

15. In an apparatus adapted for two stage operation of a motor vehicle provided with a transmission having speed ratio changing mechanism and driven through the transmission by an engine provided with a throttle to regulate its speed, the combination with automatic means to actuate the speed ratio changing mechanism in response to the speed of the engine as varied by the throttle opening, of means ineffective below and operable by the operator above an intermediate engine speed to actuate the speed changing mechanism.

16. In an apparatus adapted for two stage operation of a motor vehicle provided with a transmission having speed ratio changing mechanism and driven through the transmission by an engine provided with a throttle to regulate its speed, the combination with automatic means to actuate the speed ratio changing mechanism in response to the speed of the engine as varied by the throttle opening, of means ineffective below and operable by the operator above an intermediate engine speed to actuate the speed changing mechanism independently of the automatic means.

17. In an apparatus adapted for two stage operation of a motor vehicle provided with a transmission mechanism having speed ratio changing mechanism and driven thru the transmission mechanism by an engine having a throttle to control the engine speed, the combination with automatic means to actuate the speed-ratio changing mechanism of the transmission mechanism in response to engine speed as varied by the throttle opening of operator-operable means for actuating the speed ratio changing mechanism to vary the speed-ratio above an intermediate engine speed, and means whereby the automatic means will reassume control of the speed ratio changing mechanism in response to a predetermined higher engine speed.

18. In an apparatus for two stage operation of a motor vehicle provided with a transmission mechanism having speed ratio changing mechanism and driven through the transmission mechanism by an engine having a throttle to control the engine speed, the combination of mechanism operative automatically to actuate the ratio changing mechanism at an intermediate engine speed in response to the speed of the engine; operator controllable means ineffective at engine speeds below and effective at engine speeds above said intermediate engine speed for actuating said ratio changing mechanism independently of the automatic means.

19. In a motor vehicle, the combination of an engine provided with a throttle adapted to control engine speed; a variable speed-ratio transmission mechanism adapted to transmit power from the engine; a speed ratio changing device; a governor; an operator controllable device; means whereby the throttle may be opened and closed in response to actuations of the operator controllable device; means whereby the governor controls the ratio changing device at a moderate engine speed, and at a predetermined higher engine speed, and operative connections between the operator controllable device and the speed ratio changing device whereby the operator may vary the speed ratio independently of governor action.

20. Apparatus for control of the velocity of a motor vehicle provided with a transmission mechanism having speed ratio changing mechanism and driven by an engine having a throttle to control engine speed, the combination of automatic mechanism to actuate the ratio changing mechanism in proportion to engine speed, an operator controllable device, and connections therefrom to the throttle and to the speed ratio changing mechanism, adapted after a desired velocity has been attained to vary the speed ratio of the transmission while maintaining a predetermined constant throttle opening, said connections embodying devices permitting differential movement whereby the speed changing mechanism may be actuated by the operator while the throttle remains constantly open.

21. In a motor vehicle, the combination of an engine provided with a throttle adapted to control engine speed; a variable speed ratio transmission mechanism adapted to transmit power from the engine; automatic means constructed and arranged to adjust the ratio of the transmission mechanism in proportion to engine speed; operator controllable means constructed and arranged to open and close the throttle and to adjust the ratio of the transmission mechanism independently of the automatic means.

22. In a motor vehicle, the combination of an engine provided with means for controlling engine speed, a variable speed ratio transmission mechanism driven by the engine; means for varying the speed ratio of the transmission mechanism; operator controllable means for adjusting the engine speed controlling means; operator controllable means operatively connected to the means for varying the speed ratio of the transmission mechanism; a governor; means connecting the governor with the means for varying the speed ratio of the transmission mechanism whereby the governor controls the ratio of the transmission at a predetermined moderate engine speed and at a predetermined higher engine speed to the exclusion of transmission ratio control by said operator controllable means at said moderate and higher engine speeds.

23. In a motor vehicle, the combination of an engine provided with means for regulating engine speed; a variable speed ratio transmission mechanism driven by the engine; means for varying the speed ratio of the transmission mechanism; operator controllable means for adjusting the engine speed regulating means; operator controllable means operatively connected to the means for varying the speed ratio of the transmission mechanism; a governor; operative connecting means between the governor and the means for varying the speed ratio of the transmission mechanism, said connecting means including a lost motion device.

24. In a motor vehicle, the combination of an engine having means for regulating engine speed; a variable speed ratio transmission mechanism driven by the engine; means for varying the speed ratio of the transmission mechanism; operator controllable means for adjusting the engine speed regulating means; operator controllable means operatively connected to the means for varying the speed ratio of the transmission mechanism; an automatic governor and an operative connection between the governor and the means for varying the speed ratio of the transmission mechanism, said connections from the operator controllable means and from the governor to the means for varying the speed ratio of the transmission mechanism being of a differential character and so proportioned and arranged that the governor may control the speed ratio of the transmission during engine speeds at a predetermined moderate speed and at a predetermined higher engine speed and release the control to the operator at engine speeds between said intermediate and high speeds.

25. In a motor vehicle the combination of an engine provided with a speed regulating device controllable by the operator; a variable speed ratio transmission; a ratio control device; a speed responsive governor; means whereby the governor may control the ratio control device at a predetermined moderate engine speed; and means controlled by the operator for adjusting the ratio control device independently of the governor at speeds above said intermediate speed.

26. Means for controlling the speed of a motor vehicle equipped with an internal combustion engine and a transmission mechanism susceptible of infinite variation of speed ratio within the range permitted by its construction, comprising means for supplying fuel to the engine; ratio control means, an operator controllable device operatively connected to the ratio control means, a governor, operative connections between the governor and the ratio control means constructed and arranged to adjust the transmission ratio so as to keep the engine running at a predetermined moderate speed and at a predetermined higher speed, and to release control of the transmission ratio to the operator at engine speeds between said predetermined moderate and higher engine speeds.

27. The combination of an engine, a throttle for controlling the engine speed, a throttle actuating means, a variable speed ratio power transmitting mechanism, means for changing the ratio adjustment of said variable speed ratio power transmitting mechanism, fluid pressure means arranged to actuate said ratio changing means, a device for controlling the operation of the fluid pressure means and thereby selectively determining the extent of ratio change, and means whereby movement of the throttle actuating means imparts controlling movement to the device for controlling the operation of the fluid pressure means.

28. The combination of an engine, an engine throttle, a variable speed power transmission mechanism driven by the engine, a ratio control means for said power transmission mechanism, said ratio control means having connection with the throttle, a speed responsive governor constructed and arranged to operate said ratio control means, and connecting means between said governor and said ratio control means including means operative at below a predetermined speed to prevent selection of speed-ratio by movement of the throttle, and means whereby said throttle connection is continuously operative to vary the speed-ratio at governor speeds greater than said predetermined speed.

29. In a motor vehicle, the combination of an engine, operator actuated means to vary the speed of the engine, variable speed ratio power transmitting mechanism, a ratio-control device, a speed responsive governor, regulating and actuating mechanism for said ratio control device comprising one element connecting the ratio-control device with said operator actuated means to vary the engine speed, a second element connecting said ratio-control device to the governor, and means so correlating the operative effect of said elements that governor control is released to the operator actuated means after a predetermined engine speed has been attained.

30. In a motor vehicle, an engine, a throttle therefor, a variable speed ratio power transmitting mechanism, a fluid pressure motive power device, a valve for controlling the operation of the fluid pressure device, a speed responsive element, means actuated by the speed responsive element to move the valve during one predetermined speed range thereof, and an operator controllable device correlated with the throttle and with said valve so as to operate the valve during another predetermined speed range of said element.

31. The combination of a variable speed power transmitting mechanism susceptible of a predetermined range of speed ratio adjustment; fluid pressure mechanism for varying the ratio thereof; a control means for controlling the operation of said fluid pressure mechanism; a speed responsive governor and a driver-operatable device, both operatively connected to said control means and having means effective during both increasing and decreasing ratio adjustment to restrict actuation of said control means to the governor to the exclusion of driver actuation during one portion of the range of speed ratio adjustment and during another portion of said range of speed ratio adjustment to restrict actuations of said control means to the driver-operatable device to the exclusion of governor actuation.

32. The combination of variable speed transmission mechanism adapted to afford a predetermined range of speed ratios; a ratio control means adapted to select and change the speed ratio; means for actuating said ratio control means including a speed responsive governor and a driver-operatable means; means connecting said governor and driver-operatable means with said ratio control means for actuating the latter, said means including means constructed and operatively related to transmit during both increasing and decreasing ratio adjustment actuating efforts of the governor to said ratio control means during one portion of said predetermined range of speed ratios to the exclusion of driver control, and during another portion of said predetermined range of speed ratios to transmit the actuating efforts of the driver-operatable means to said ratio control means to the exclusion of governor control.

33. The combination of a variable speed transmission mechanism providing a range of speed ratios, with a ratio control means adapted to select and change the ratios; means for actuating said ratio control means including a speed responsive governor and a driver-operatable means; means operatively connecting said governor and said driver-operatable means with said ratio control means for actuating the latter, including means constructed and operatively related to transmit during both increasing and decreasing ratio adjustments actuating efforts of the governor to said ratio control means during a predetermined low range and a predetermined high range of speed ratios to the exclusion of driver control, and to transmit the actuating efforts of the driver-operatable means to said ratio control means during an intermediate range of speed to the exclusion of governor control.

JOHN O. ALMEN.
HARRY HAWKINS.